UNITED STATES PATENT OFFICE.

CARL F. HAGEDORN, OF CHICAGO, ILLINOIS, ASSIGNOR TO MINERAL PRODUCTS CORPORATION, OF NEW YORK, N. Y., A CORPORATION OF MAINE.

SEPARATION OF ALUNITE FROM ASSOCIATED ROCK OR GANGUE.

1,253,591. Specification of Letters Patent. Patented Jan. 15, 1918.

No Drawing. Application filed October 26, 1917. Serial No. 198,586.

*To all whom it may concern:*

Be it known that I, CARL F. HAGEDORN, a citizen of the United States, residing at Chicago, in the county of Cook, State of Illinois, have invented certain new and useful Improvements in Separation of Alunite from Associated Rock or Gangue; and I do hereby declare the following to be a full, clear, and exact description of the invention, such as will enable others skilled in the art to which it appertains to make and use the same.

Alunite deposits, as found in nature, usually contain, interspersed therein, foreign material consisting of silica and fragments of silicious minerals such as native rhyolite and the like. So also, when found in vein formation, the alunite is usually flanked on either side by disrupted or shattered native rock. In the mining of alunite, the silica and the silicious minerals and native rocks such as rhyolite associated therewith, appear together in the mined product, and are difficult of separation from the alunite mechanically.

The purpose of the present invention is to effect such separation.

In carrying out the invention, the mined product is first roasted or calcined in such a way that the sulfuric acid combined with the alumina in the alunite is partially or wholly driven off. The roasting or calcining operation is carried on, either in a muffle, externally heated, or in any suitable roasting or calcining kiln. If a roasting or calcining kiln is employed, it will be preferably an inclined rotary kiln of the kind used in cement practice. If it is desired to completely calcine the alunite, the kiln should be of such length and should have such a pitch as to allow the material to remain in the kiln for a period of time sufficient for its complete calcination. The time of travel of the charge in the kiln from the upper end to the lower discharge end thereof, will, of course, depend upon varying conditions, prominent among which are the size of the particles to be charged and the temperature employed. Good results are obtained when the material charged is of one-quarter inch mesh with the accompanying fines and when the time of travel through the kiln is from one to three hours. The temperature should be such as to heat the product before it is discharged from the kiln to from 800° C. to 1200° C. In general, a temperature of about 1000° C. is preferred, for the reason that, at that temperature, complete calcination of the alunite may be obtained without danger of driving off by volatilization the potash contained in the alunite.

The calcined or roasted charge issuing from the kiln contains the silica and the silicious minerals, such as rhyolite or native rock, practically unchanged in specific gravity and insoluble in water. The original alunite, on the other hand, has been converted into a porous material consisting of alumina insoluble in water, and potassium sulfate which is soluble in water.

The fuel employed for heating the rotary kiln is to be of such a character as to exclude from the kiln any substantial addition of silica. That is to say, instead of employing, for instance, pulverized coal as the fuel supply for the injector burner used for heating the charge in the rotary kiln, I prefer to employ a fuel such as producer gas, whose combustion is unaccompanied with the admission of additional silica to the charge. If pulverized coal were supplied to the injector burner, the combustion of the coal would supply to the charge of alunite, an additional amount of silica contained in the coal ash, and it is found that the silica thus supplied, in a finely-divided state, and under the high temperature conditions prevailing in the kiln and its charge, tends to adhere with more or less tenacity to the particles of calcined alunite, so that the line of demarcation between the particles of alunite and the particles of silica and of silicious minerals such as rock or rhyolite is less distinct, thereby materially affecting the efficiency of the subsequent separation of the alunite and rhyolite.

When the kiln is fired by a gas flame or like silica-excluding combustible, or when the calcining operation is conducted in an externally heated muffle, it is found that the resulting product, to wit, the particles of calcined alunite and the particles of silica, and of silicious minerals, such as native rock or rhyolite, are in such physical condition that their separation may be readily effected by any suitable sizing operation. For instance, they may be separated by sieving the particles of smaller size, in which the calcined alunite predominates almost to the exclusion of the native rock or rhyolite, passing through the sieve and being recovered as the concentrates; or, the separation may be effected on any suitable classifying table, or by any suitable classifying jig, or the like; or, inasmuch as the calcining operation decreases the specific gravity of the alunite, without affecting materially the specific gravity of the associated silica or of the silicious materials such as rhyolite and the like, the separation of the alunite from the remaining constituents of the calcined charge can be effected in any suitable apparatus depending upon difference in specific gravities to bring about such separation.

It will be understood that the potassium sulfate contained in the calcined alunite may, to advantage, be dissolved out therefrom in any suitable way, either before or during the operation of separating the silica and the silicious minerals, such as rhyolite and the like from the calcined alunite.

Having thus described my invention, what I claim is:

1. The method of separating silica, or silicious minerals such as rhyolite or the like, from alunite, which comprises subjecting the alunite and its associated silica or silicious minerals to a roasting or calcining operation, such roasting or calcining operation being carried on with the exclusion of silica other than that contained in the charge undergoing separation, and then separating the silica or silicious minerals from the calcined alunite of the roasted product; substantially as described.

2. The method of separating silica, or silicious minerals such as rhyolite or the like from alunite, which comprises calcining or roasting the mixture in a rotary kiln by means of an injected fuel whose combustion in the kiln will furnish substantially no additional silica to the charge undergoing calcination, and then separating the silica or silicious minerals from the calcined alunite of the roasted product; substantially as described.

In testimony whereof I affix my signature.

CARL F. HAGEDORN.